US009970642B2

(12) United States Patent
Chien et al.

(10) Patent No.: US 9,970,642 B2
(45) Date of Patent: May 15, 2018

(54) ANTI-EXPLOSION LED LAMP HOUSING

(71) Applicant: Li-Hong Science & Technology Co., Ltd., Kaohsiung (TW)

(72) Inventors: Ming-Tien Chien, Kaohsiung (TW); Ching-Yuan Juan, Kaohsiung (TW); Han-Wen Chang, Kaohsiung (TW); Mei-Hsiang Wu, Kaohsiung (TW); Wei-Cheng Juan, Kaohsiung (TW)

(73) Assignee: LI-HONG SCIENCE & TECHNOLOGY CO., LTD., Kaohsiung (TW)

( * ) Notice: Subject to any disclaimer, the term of this patent is extended or adjusted under 35 U.S.C. 154(b) by 0 days. days.

(21) Appl. No.: 15/258,213

(22) Filed: Sep. 7, 2016

(65) Prior Publication Data

US 2017/0146225 A1 May 25, 2017

(30) Foreign Application Priority Data

Nov. 20, 2015 (TW) ............................. 104137347 A

(51) Int. Cl.
*B60Q 1/06* (2006.01)
*F21V 25/12* (2006.01)
(Continued)

(52) U.S. Cl.
CPC .............. *F21V 25/12* (2013.01); *F21V 15/01* (2013.01); *F21V 29/507* (2015.01); *F21V 29/77* (2015.01); *F21Y 2115/10* (2016.08)

(58) Field of Classification Search
CPC ........ F21V 25/12; F21V 29/77; F21V 29/507; F21V 15/01; F21Y 2115/10
(Continued)

(56) References Cited

U.S. PATENT DOCUMENTS 7,125,146 B2 * 10/2006 Willis .................. F21V 23/005 340/852
2009/0116251 A1 * 5/2009 Harbers .................. F21V 7/041 362/373
(Continued)

FOREIGN PATENT DOCUMENTS

JP 2014137856 A * 7/2014

*Primary Examiner* — Anh Mai
*Assistant Examiner* — Glenn Zimmerman
(74) *Attorney, Agent, or Firm* — Muncy, Geissler, Olds & Lowe, P.C.

(57) ABSTRACT

An anti-explosion LED lamp housing is used to separate an illumination module from an external environment and comprises a housing body and a housing cover. The housing body includes a shell having a spherical segment-like shape, an accommodation basin connected with the concave portion of the shell, and a wiring hole penetrating the housing body and the accommodation basin. The accommodation basin includes a first platform encircling the wiring hole and receiving the illumination module; a second platform encircling the first platform and having a level difference to the first platform; and an annular wall encircling the second platform. The housing cover includes a light-permeable plate disposed on the second platform; an annular pressing element forcing the light-permeable plate to press against the second platform and engaged with the annular wall tightly. The diameter of the circular base face of the shell is 4-15 times the height of the shell.

10 Claims, 5 Drawing Sheets

(51) Int. Cl.
*F21V 29/77* (2015.01)
*F21V 15/01* (2006.01)
*F21V 29/507* (2015.01)
*F21Y 115/10* (2016.01)

(58) Field of Classification Search
USPC .......................... 362/373, 547, 240, 408, 458
See application file for complete search history.

(56) References Cited

U.S. PATENT DOCUMENTS

| | | | | |
|---|---|---|---|---|
| 2011/0267834 | A1* | 11/2011 | Potucek | F21S 8/00 362/551 |
| 2011/0317428 | A1* | 12/2011 | Paik | F21V 19/0055 362/294 |
| 2012/0182723 | A1* | 7/2012 | Sharrah | F21V 29/004 362/157 |
| 2012/0320563 | A1* | 12/2012 | Betsuda | F21K 9/135 362/84 |
| 2013/0033872 | A1* | 2/2013 | Randolph | F21V 29/004 362/294 |
| 2013/0077285 | A1* | 3/2013 | Isogai | F21V 23/006 362/84 |
| 2014/0307443 | A1* | 10/2014 | Clifford | F21V 29/74 362/294 |
| 2016/0018093 | A1* | 1/2016 | Van Winkle | F21V 23/006 362/311.02 |
| 2016/0018096 | A1* | 1/2016 | Chien | F21V 25/12 362/373 |
| 2016/0298820 | A1* | 10/2016 | Deely | F21S 8/088 |

* cited by examiner

ANTI-EXPLOSION LED LAMP HOUSING

FIELD OF THE INVENTION

The present invention relates to an anti-explosion LED lamp housing, particularly to an anti-explosion LED lamp housing, which is smooth in surface, easy to clean, and applicable to an environment with flammable material or high-density dust.

BACKGROUND OF THE INVENTION

Light-emitting diodes (LED), which feature compactness, high brightness and long service life, have been extensively used as light sources recently. While LED is used in an anti-explosion lamp, the interior of the anti-explosion lamp must be enclosed to isolate the sparks generated in electric connection from the exterior flammable gas. However, the enclosed space makes the lamp device hard to dissipate the heat accumulated thereinside. High temperature would obviously shorten the service life of LED. Therefore, heat-radiation is a critical problem in the like applications.

In the conventional anti-explosion LED lamp devices, the heat source is connected with a thermal-conduction material, and a high thermal conductivity material, such as copper, is used to conduct the waste heat to the heat-radiation fins outside the lamp device. The heat-radiation fins are normally designed to have a domino-like structure to increase the surface area and enhance the heat-radiation effect. However, the domino-like structure has a plurality of grooves, which are likely to accumulate dirt and dust and hard to clean up. While the high-temperature lamp housing contacts the dust thereon in a high-dust environment, it risks a dust explosion. Hence, how to improve the drawbacks of the conventional technology and enhance the radiation effect of the anti-explosion lamp devices is the problem the related manufacturers are eager to solve.

SUMMARY OF THE INVENTION

One objective of the present invention is to solve the problem: the conventional heat-radiation fins of the anti-explosion lamp are likely to accumulate dust, hard to clean, and probable to cause dust explosion.

In order to achieve the abovementioned objective, the present invention proposes an anti-explosion LED lamp housing, which is used to separate an illumination module from the external environment and comprises a housing body and a housing cover. The housing body includes a shell having a spherical segment-like shape, an accommodation basin connected with the concave portion of the shell, and a wiring hole penetrating the housing body and the accommodation basin. The accommodation basin includes a first platform encircling the wiring hole and receiving the illumination module; a second platform encircling the first platform and having a level difference with respect to the first platform; and an annular wall encircling the second platform. The housing cover includes a light-permeable plate disposed on the second platform and covering the illumination module; an annular pressing element forcing the light-permeable plate to press against the second platform and engaged with the annular wall 123 tightly. A shell edge is defined by the rim of the shell, which is far away from the wiring hole. The surface surrounded by the shell edge is defined as a circular base face A1. The maximum distance between the center of the base face A1 and the outer surface of the shell is defined to have a height h. The relationship between the area of the circular base face A1 and the height h meets the following equation:

$$2\sqrt{\frac{A1}{\pi}} = kh;\ 4 \le k \le 15 \tag{1}$$

In one embodiment, the sum of the areas of a smooth surface A2 and an inner heat-radiation surface A3 is proportional to the power W, wherein the power of the illumination module is denoted by W, and wherein the surface, which is between the wiring hole and the shell edge, is defined as a smooth surface A2, and wherein the surface between the shell edge and the accommodation basin is defined as an inner heat-radiation surface A3.

In one embodiment, the housing body includes a plurality of heat-radiation fins disposed on the smooth surface A2 and arranged radiately from the center of the wiring hole.

In one embodiment, each heat-radiation fin includes a tip pointing to the wiring hole; a height hf of each heat-radiation fin is gradually decreased toward the tip; the height hf of each heat-radiation fin is less than 10 mm.

In one embodiment, the shell includes a plurality of heat-radiation grooves recessed on the smooth surface A2 and arranged radiately from the center of the wiring hole.

In one embodiment, the shell includes a plurality of heat-radiation striations inscribed on the smooth surface A2.

In one embodiment, the annular wall includes an inner thread, and the housing cover includes an outer thread surrounding the annular pressing element and corresponding to the inner thread.

In one embodiment, the housing body includes a plurality of heat-radiation ribs disposed between the shell and the accommodation basin.

In one embodiment, the illumination module includes a heat-radiation substrate and light sources each partially connected with one side of the heat-radiation substrate; the accommodation basin includes a third platform disposed between the first platform and the second platform and having a level difference with respect to the first platform; the portion of each light source, which is not connected with the heat-radiation substrate, contacts the third platform.

In one embodiment, the housing cover includes two packing rings respectively disposed between the light-permeable plate and the second platform and disposed between the light-permeable plate and the annular pressing element.

Thereby, the present invention has the following efficacies:

1. The present invention controls the geometric proportionality of the anti-explosion LED lamp housing and designs the surface of the anti-explosion LED lamp housing to have a smooth surface, which is hard to accumulate dirt and dust, favors cleaning, and reduces the cost of mold fabrication.
2. The present invention designs the illumination module to contact the first platform and the third platform to radiate heat from the shell fast. The present invention uses the annular pressing element to press the light-permeable plate against the second platform and thus enhances the structure of the anti-explosion LED lamp housing. The annular pressing element is screwed into the annular wall through the threads and able to isolate the interior of the lamp housing from the external environment. Thus, the present invention meets the international standard of anti-explosion electric appliances.

DETAILED DESCRIPTION OF THE PREFERRED EMBODIMENTS

Figure 1:
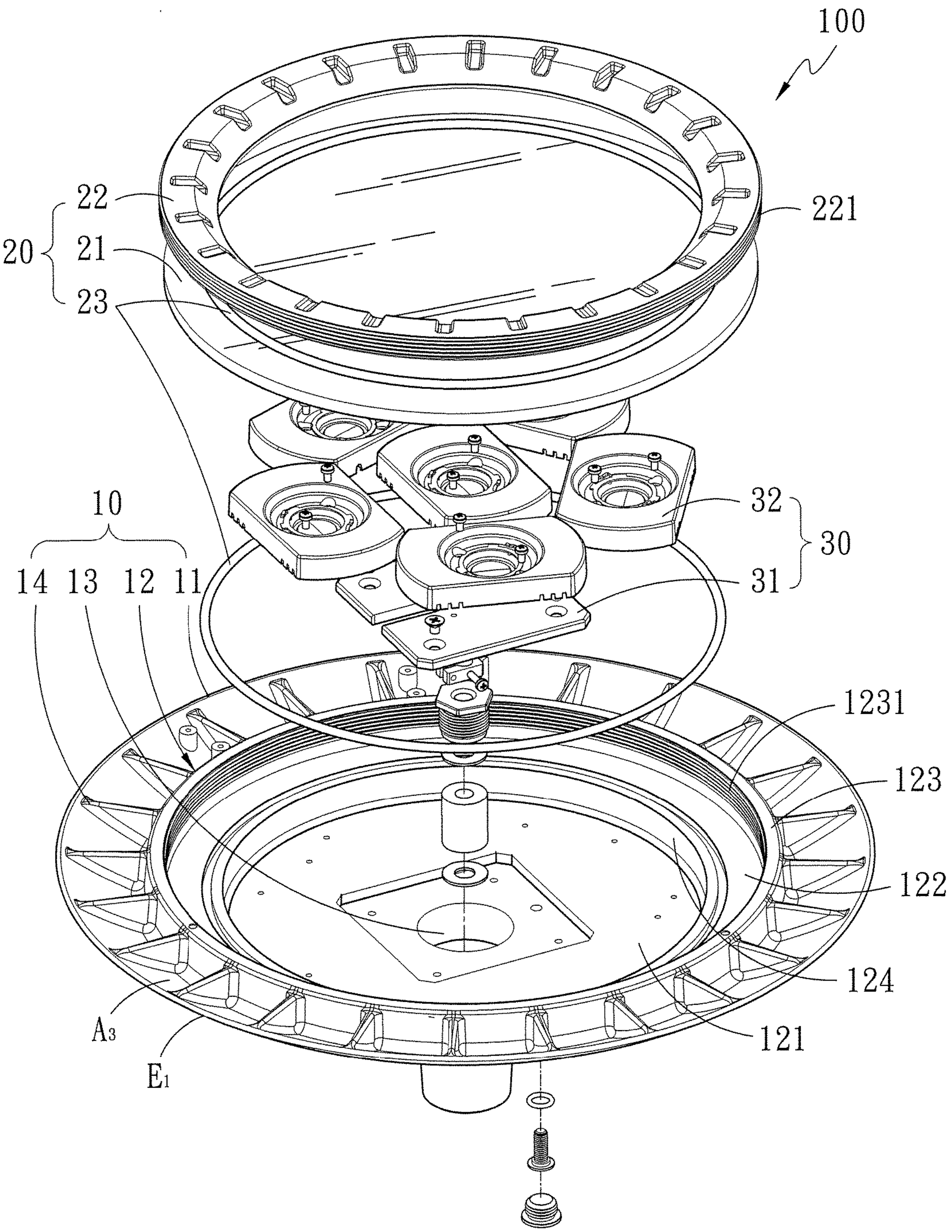
FIG. 1 is an exploded view schematically showing an anti-explosion LED lamp housing according to a first embodiment of the present invention.

Refer to FIG. 1 for a first embodiment of the present invention. The present invention provides an anti-explosion LED (Light Emitting Diode) lamp housing, which is used to separate an illumination module 30 from the external environment, particularly the environment having flammable material or explosive material, such as petrochemical factories, coal factories, or the factories having high-density dust. However, the abovementioned environments are only to exemplify the application environments of the present invention. The present invention is not limited to be only applied to these environments.

In the first embodiment, the anti-explosion LED lamp housing 100 of the present invention comprises a housing body 10 and a housing cover 20. The housing body 10 includes a shell 11 having a spherical segment-like shape, an accommodation basin 12 connected with the concave portion of the shell 11, and a wiring hole 13 penetrating the housing body 10 and the accommodation basin 12. The housing body 10 is made of a metallic material having higher thermal conduction efficiency and better corrosion resistance, such as an aluminum alloy. The shell 11 has a shallow dish-like shape. The accommodation basin 12 is disposed along the rim of the central concaved portion of the shell 11, accommodating the illumination module 30 and other components. The accommodation basin 12 includes a first platform 121 encircling the wiring hole 13 and receiving the illumination module 30; a second platform 122 encircling the first platform 121 and having a level difference with respect to the first platform 121; and an annular wall 123 encircling the second platform 122.

The housing cover 20 includes a light-permeable plate 21 disposed on the second platform 122 and covering the illumination module 30; an annular pressing element 22 forcing the light-permeable plate 21 to press against the second platform 122 and engaged with the annular wall 123 tightly. The light-permeable plate 21 is made of a light-permeable material, such as glass or acrylic resin. The annular pressing element 22 is made of an aluminum alloy or a material the same as the shell 11. In the first embodiment, the annular wall 123 includes an inner thread 1231, and the housing cover 20 includes an outer thread 221 surrounding the annular pressing element 22 and corresponding to the inner thread 1231. The housing cover 20 further includes two packing rings 23, such as plastic O-rings, disposed between the light-permeable plate 21 and the second platform 122 and disposed between the light-permeable plate 21 and the annular pressing element 22 respectively. The user can easily press tightly the light-permeable plate 21 merely via screwing the annular pressing element 22 into the annular wall 123, whereby the packing rings 23 deform to seal the space inside the accommodation basin 12. The abovementioned method of engage the annular pressing element 22 to the annular wall 123 is only an exemplification. The annular pressing element 22 can also be engaged to the annular wall 123 with other methods in the present invention.

Figure 2:
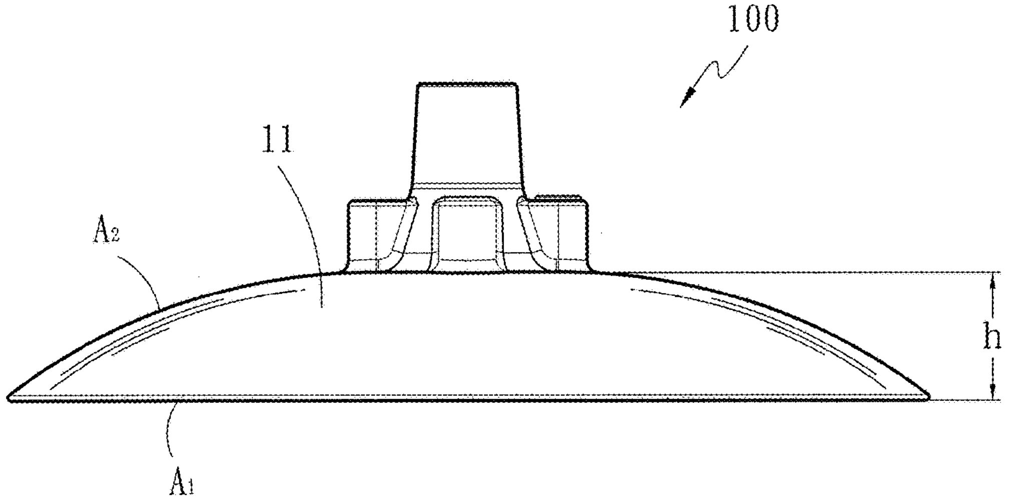
FIG. 2 is a side view schematically showing an anti-explosion LED lamp housing according to the first embodiment of the present invention.

Refer to FIG. 1 and FIG. 2. A shell edge E1 is defined by the rim of the shell 11, which is far away from the wiring hole 13. The surface encircled by the shell edge E1 is defined as a circular base face A1. The maximum distance between the center of the base face A1 and the outer surface of the shell 11 is defined to have a height h. The relationship between the area of the circular base face A1 and the height h meets Equation (1):

$$2\sqrt{\frac{A1}{\pi}} = kh;\ 4 \le k \le 15 \tag{1}$$

From Equation (1), it is learned: the diameter of the circular base face A1 is k times the height h. In the present invention, the value of k is set to be between 4 and 15. The shell 11 may be regarded as the surface truncated from a complete spherical surface, and the diameter of the circular base face A1 is equal to 4-15 times the height h, wherein the height h is the maximum distance between the center of the base face A1 and the outer surface of the shell 11. Therefore, Equation (1) limits the shell 11 to have a shallow dish-like shape. The limitation makes the conduction path of waste heat shorter and makes waste heat conducted to the surface of shell 11 more uniformly. Suppose that the power of the illumination module 30 is W. The surface, which is between the wiring hole 13 and the shell edge E1 and adjacent to the circular base face A1, is defined as a smooth surface A2. The surface between the shell edge E1 and the accommodation basin 12 is defined as an inner heat-radiation surface A3. In the present invention, the sum of the areas of the smooth surface A2 and the inner heat-radiation surface A3 is proportional to the power W to make the heat-radiation efficient sufficient to exhaust waste heat. Suppose that the anti-explosion LED lamp housing 100 of the present invention is used in a working field having an average temperature of 40° C., and suppose that the surface temperature of the anti-explosion LED lamp housing 100 is to be maintained at a temperature below 70° C. Thus, the sum of the areas of the smooth surface A2 and the inner heat-radiation surface A3 should be increased by 18-25 $cm^2$ for each power increment of 1 watt. If the power of the anti-explosion LED lamp housing 100 consumes a power of 75 watts, the sum of the areas of the smooth surface A2 and the inner heat-radiation surface A3 must meet Equation (2):

$$25\ cm^2 \times 75 \ge A2 + A3 \ge 18\ cm^2 \times 75$$

$$1875\ cm^2 \ge A2A3 \ge 1350\ cm^2 \tag{2}$$

Thereby, the anti-explosion LED lamp housing 100 of the present invention can prevent LED from overheating without using any heat-radiation fins. Besides, the smooth surface of the anti-explosion LED lamp housing 100 of the present invention not only can reduce the cost of mold fabrication but also is less likely to accumulate dirt and dust. Therefore, the anti-explosion LED lamp housing 100 of the present invention can effectively prevent from dust explosion.

Figure 3A:
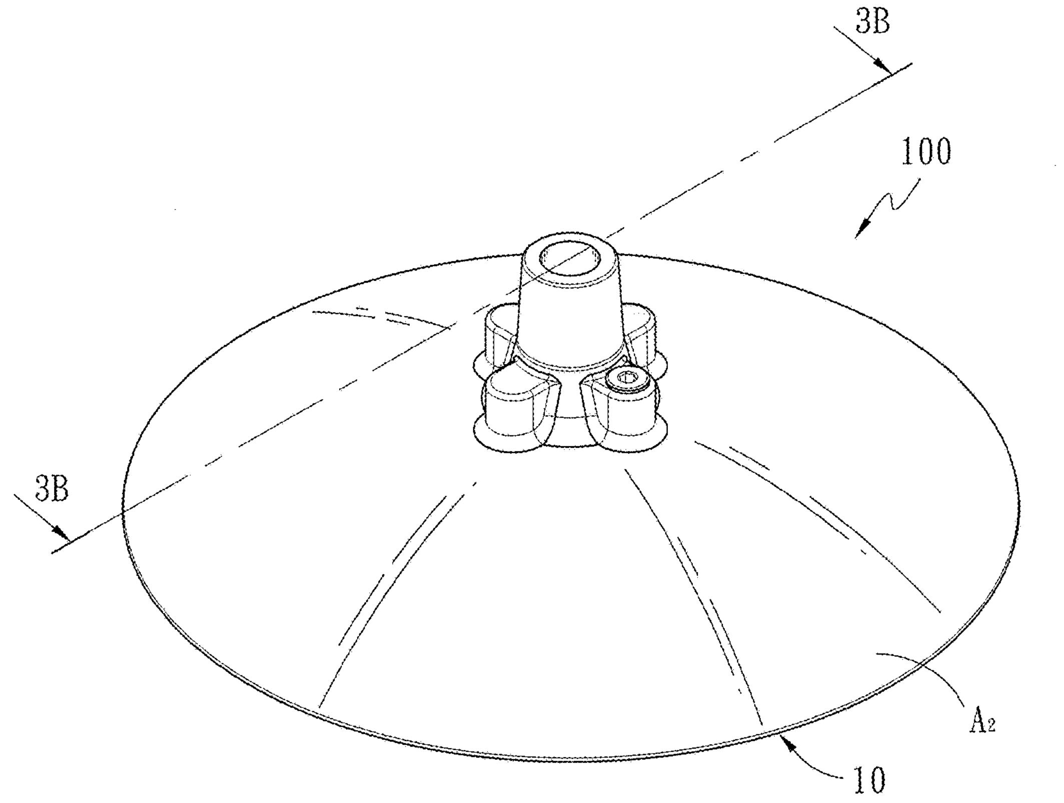
FIG. 3A is a perspective view schematically showing the assemblage of an anti-explosion LED lamp housing according to the first embodiment of the present invention.
Figure 3B:
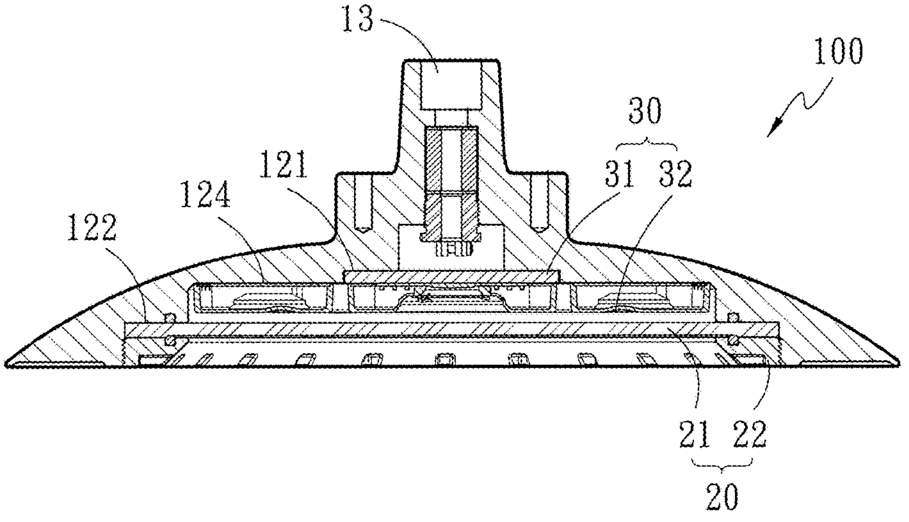
FIG. 3B is a sectional view taken along Line 3B-3B in FIG. 3A.

Refer to FIG. 1, FIG. 3A and FIG. 3B. In the first embodiment, the illumination module 30 includes a heat-radiation substrate 31 and light sources 32 each partially connected with one side of the heat-radiation substrate 31. As each light source 32 is partially connected with one side of the heat-radiation substrate 31, there is a vertical altitude drop between the bottom surface of the light source 32 and the first platform 121. The accommodation basin 12 includes a third platform 124 disposed between the first platform 121 and the second platform 122 and having a level difference with respect to the first platform 121. The portion of each light source 32, which is not connected with the heat-radiation substrate 31, contacts the third platform 124. Thus, the heat in the heat-radiation substrate 31 is conducted to the first platform 121 and dissipated therefrom; the heat of the light source 32 is partly conducted to the third platform 124 and dissipated therefrom. Thereby is achieved a better heat-radiation effect.

Figure 4A:
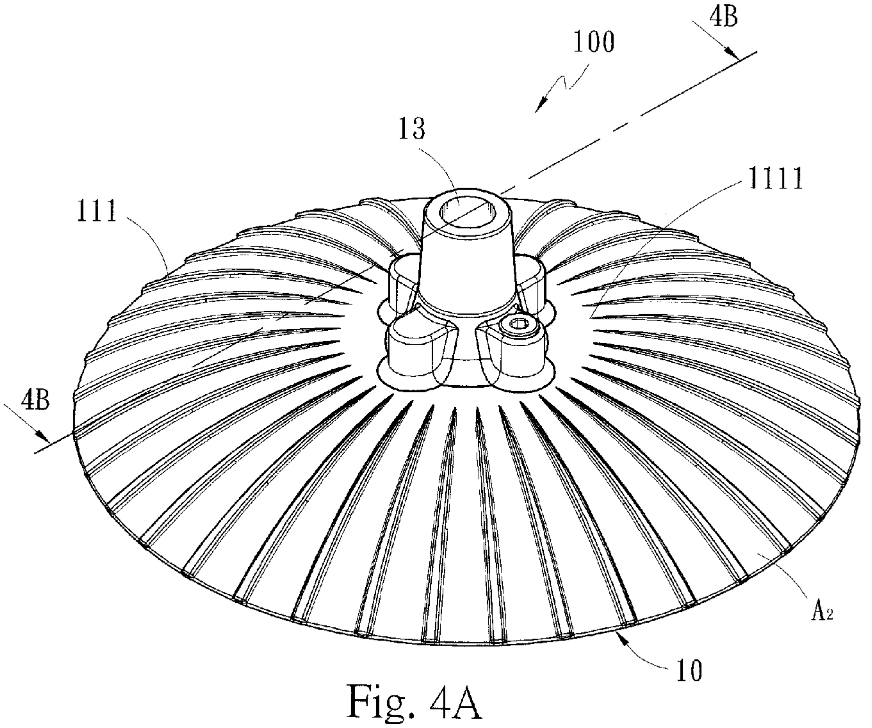
FIG. 4A is a perspective view schematically showing the assemblage of an anti-explosion LED lamp housing according to a second embodiment of the present invention.
Figure 4B:
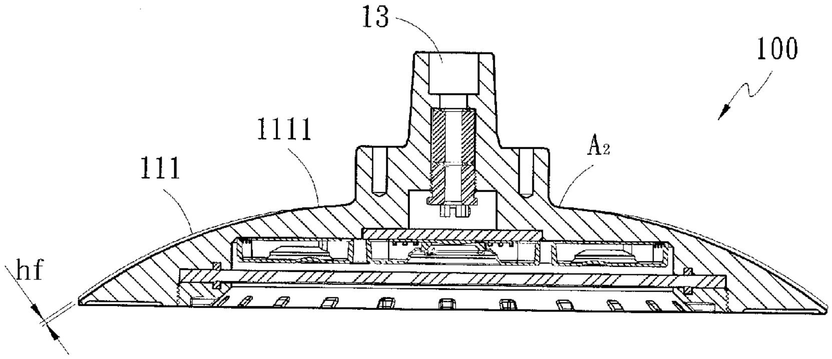
FIG. 4B is a sectional view taken along Line 4B-4B in FIG. 4A.

Besides, as the light sources 32 normally project light to the ground, the inner heat-radiation surface A3 is less likely to accumulate dirt and dust. In order to increase the heat-radiation efficiency, the housing body 10 includes a plurality of heat-radiation ribs 14 disposed between the shell 11 and the accommodation basin 12 and used to increase the heat-radiation area of the inner heat-radiation surface A3. Refer to FIG. 4A and FIG. 4B for a second embodiment of the present invention. In order to enhance the heat-radiation effect of the anti-explosion LED lamp housing 100, the housing body 10 includes a plurality of heat-radiation fins 111 disposed on the smooth surface A2 and arranged radiately from the center of the wiring hole 13. Each heat-radiation fin 111 has a height hf less than 10 mm. Therefore, the level difference between each heat-radiation fin 111 and the smooth surface A2 is insignificant. Therefore, the heat-radiation fins 111 only accumulate a negligible amount of dust. Further, the heat-radiation fins 111 do not hinder cleaning. Each heat-radiation fin 111 has a tip 1111 pointing to the wiring hole 13. The height hf of each heat-radiation fin 111 is gradually decreased toward the tip 1111 to maintain the smoothness of the upper surface of the shell 11 lest too much dust accumulate on the upper surface of the shell 11.

Figure 5A:
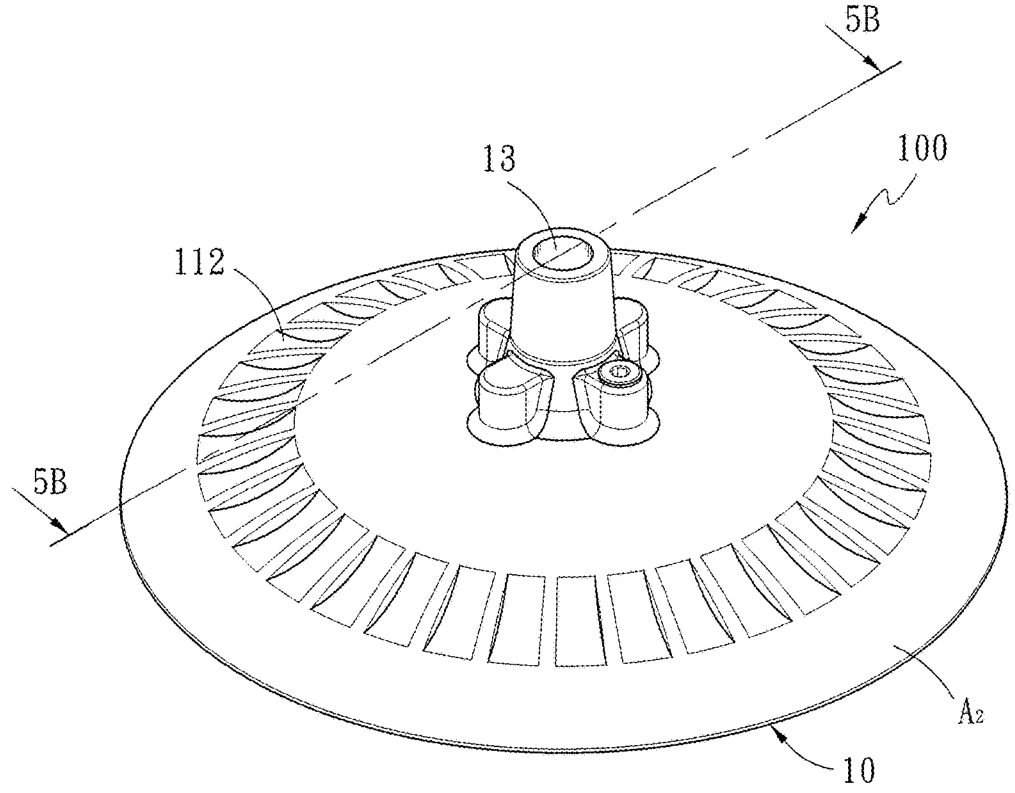
FIG. 5A is a perspective view schematically showing the assemblage of an anti-explosion LED lamp housing according to a third embodiment of the present invention.
Figure 5B:
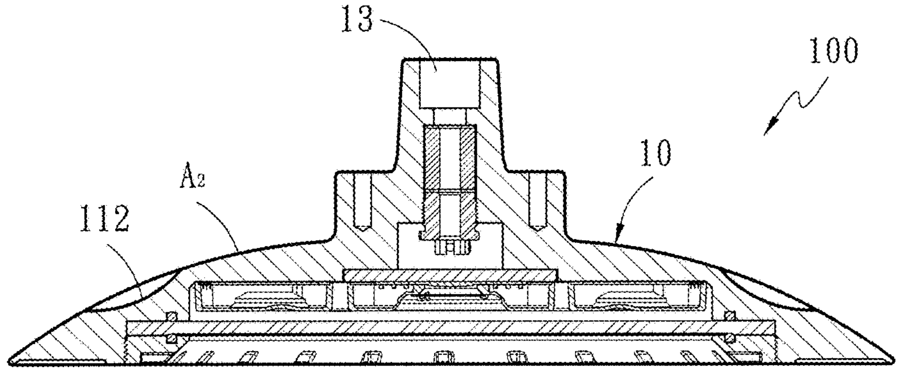
FIG. 5B is a sectional view taken along Line 5B-5B in FIG. 5A.

Refer to FIG. 5A and FIG. 5B for a third embodiment of the present invention. In the third embodiment, the shell 11 includes a plurality of heat-radiation grooves 112 recessed on the smooth surface A2 and arranged radiately from the center of the wiring hole 13. The heat-radiation grooves 112 generate a recess and relief structure, which enlarges the surface area and increases the heat-radiation efficiency. Each heat-radiation groove 112 is merely a shallow trench on the smooth surface A2 and less likely to accumulate dust. In one embodiment, the shell 11 includes a plurality of heat-radiation striations (not shown in the drawings) inscribed on the smooth surface A2 to increase the heat-radiation efficiency.

In conclusion, the present invention defines the geometric proportionality of the anti-explosion LED lamp housing and designs the upper surface of the anti-explosion LED lamp housing to have a smooth surface or a recess-and-relief surface convexed and concaved slightly, which is hard to accumulate dirt and dust, favors cleaning, and reduces the probability of dust explosion. Besides, the present invention uses the annular pressing element and the annular wall to effectively convenience assemblage. Further, the present invention orientates the heat-radiation fins toward the same direction as the light sources project light, maintaining the heat-radiation efficiency without accumulating dust.

What is claimed is:

1. An anti-explosion LED lamp housing, used to separate an illumination module from an external environment, and comprising:

a housing body including a shell having a spherical segment-like shape, an accommodation basin connected with the concave portion of the shell, and a wiring hole penetrating the housing body and the accommodation basin, wherein the accommodation basin includes a first platform encircling the wiring hole and receiving the illumination module; a second platform encircling the first platform and having a level difference with respect to the first platform; and an annular wall encircling the second platform; and a housing cover including a light-permeable plate disposed on the second platform and covering the illumination module; an annular pressing element forcing the light-permeable plate to press against the second platform and engaged with the annular wall tightly, wherein a shell edge is defined by the rim of the shell, which is far away from the wiring hole; the surface encircled by the shell edge is defined as a circular base face A1; the maximum distance between the center of the base face A1 and the outer surface of the shell is defined to have a height h; the relationship between the area of the circular base face A1 and the height h meets an equation:

$$2\sqrt{(A1/\pi)}=kh;\ 4\leq k\leq 15.$$

2. The anti-explosion LED lamp housing according to claim 1, wherein the power of the illumination module is denoted by W; the surface, which is between the wiring hole and the shell edge, is defined as a smooth surface A2; the surface between the shell edge and the accommodation basin is defined as an inner heat-radiation surface A3; the sum of the areas of the smooth surface A2 and the inner heat-radiation surface A3 is proportional to the power W.

3. The anti-explosion LED lamp housing according to claim 1, wherein the annular wall includes an inner thread, and the housing cover includes an outer thread surrounding the annular pressing element and corresponding to the inner thread.

4. The anti-explosion LED lamp housing according to claim 1, wherein the housing body includes a plurality of heat-radiation ribs disposed between the shell and the accommodation basin.

5. The anti-explosion LED lamp housing according to claim 1, wherein the illumination module includes a heat-radiation substrate and light sources each partially connected with one side of the heat-radiation substrate; the accommodation basin includes a third platform disposed between the first platform and the second platform and having a level difference with respect to the first platform; the portion of each light source, which is not connected with the heat-radiation substrate, contacts the third platform.

6. The anti-explosion LED lamp housing according to claim 1, wherein the housing cover includes two packing rings respectively disposed between the light-permeable plate and the second platform and disposed between the light-permeable plate and the annular pressing element.

7. The anti-explosion LED lamp housing according to claim 2, wherein the housing body includes a plurality of heat-radiation fins disposed on the smooth surface A2 and arranged radiately from the center of the wiring hole.

8. The anti-explosion LED lamp housing according to claim 2, wherein the shell includes a plurality of heat-radiation grooves recessed on the smooth surface A2 and arranged radiately from the center of the wiring hole.

9. The anti-explosion LED lamp housing according to claim 2, wherein the shell includes a plurality of heat-radiation striations inscribed on the smooth surface A2.

10. The anti-explosion LED lamp housing according to claim 7, wherein each heat-radiation fin includes a tip pointing to the wiring hole; a height hf of each heat-radiation fin is gradually decreased toward the tip; the height hf of each heat-radiation fin is less than 10 mm.

* * * * *